UNITED STATES PATENT OFFICE.

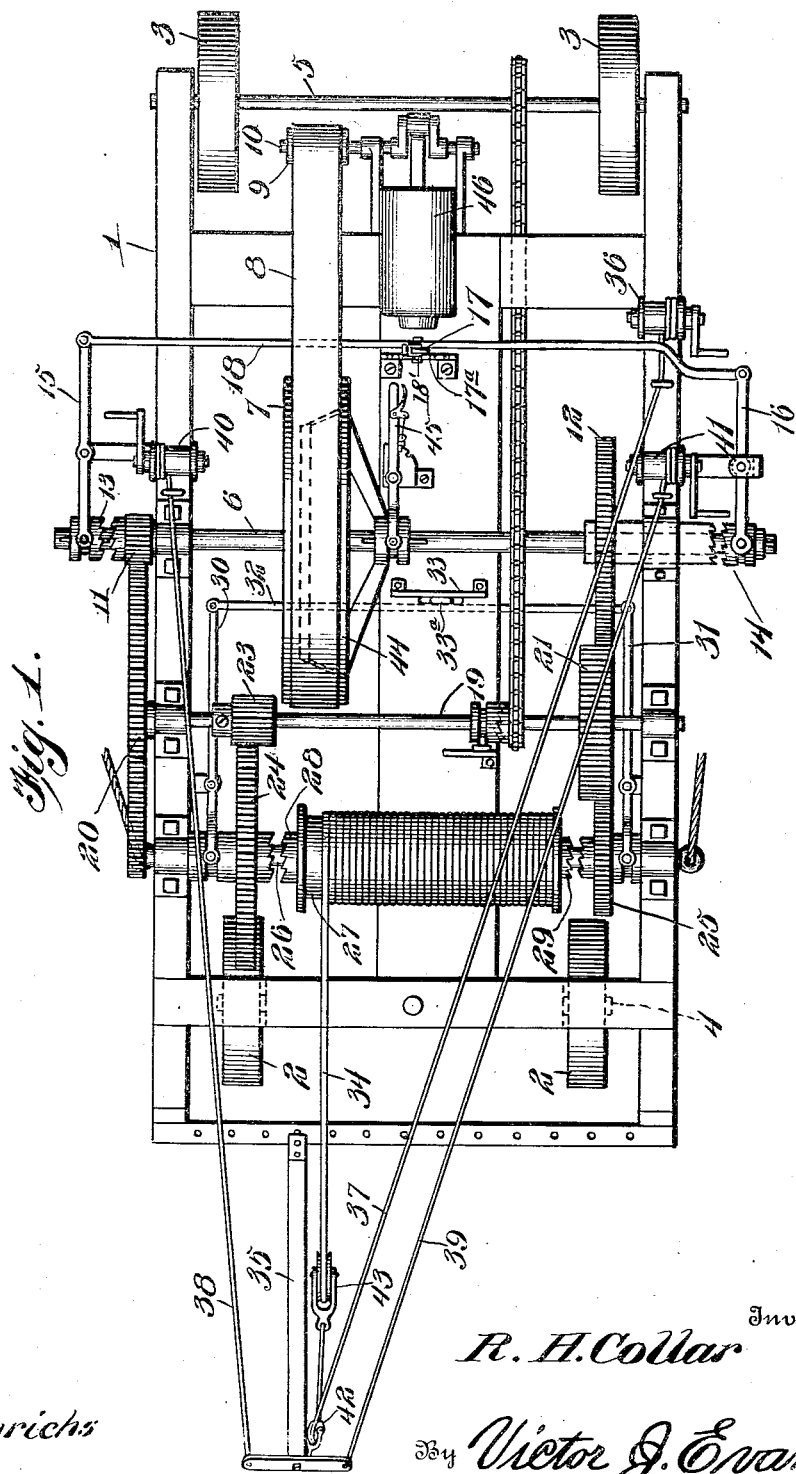

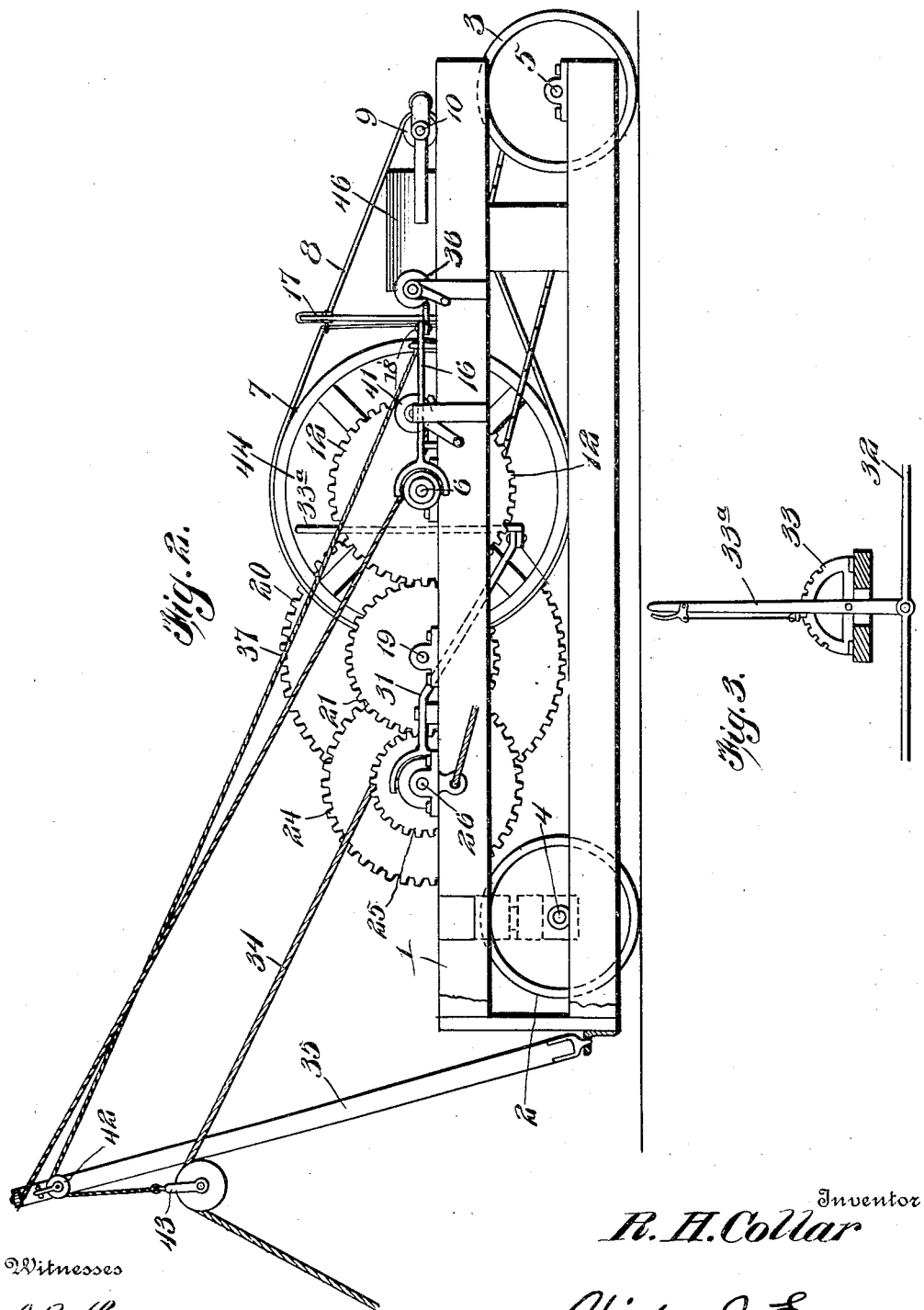

ROBERT H. COLLAR, OF NORTHOME, MINNESOTA.

LAND-CLEARING MACHINE.

1,194,958.   Specification of Letters Patent.   Patented Aug. 15, 1916.

Application filed June 5, 1914. Serial No. 843,247.

*To all whom it may concern:*

Be it known that I, ROBERT H. COLLAR, a citizen of the United States, residing at Northome, in the county of Koochiching and State of Minnesota, have invented new and useful Improvements in Land-Clearing Machines, of which the following is a specification.

This invention relates to a machine for clearing land of stumps, trees, boulders and other obstructing objects.

The purpose of the invention is the provision of a machine which admits of any one of a plurality of speeds being brought into operation according to the nature of the work, such machine embodying a simple and compact arrangement of parts and which machine is portable and capable of being readily controlled.

The invention consists of the novel features, details of construction and combination of parts, which hereinafter will be more particularly set forth, illustrated and claimed.

In the drawings hereto attached:—Figure 1 is a top plan view of a land clearing machine embodying the invention. Fig. 2 is a side elevation. Fig. 3 is a detail view of a clutch operating lever.

Corresponding and like parts are referred to in the following description, and indicated in all the views of the drawings, by the same reference characters.

The operating parts are mounted upon a frame work 1 which in turn is supported upon front wheels 2 and rear wheels 3, such wheels being mounted upon front and rear axles 4 and 5 respectively. The numeral 6 designates a counter-shaft upon which is mounted a pulley 7 which is connected by means of a drive belt 8 with a pulley 9 on the shaft 10 of the engine. Gear wheels 11 and 12 are loose upon the counter-shaft 6 and are formed at their sides with half clutches which are adapted to be engaged by means of clutches 13 and 14 respectively which are splined upon the shaft 6 so that either one of the gear wheels 11 or 12 may be caused to rotate with the shaft 6. A lever 15 engages the clutch sleeve 13. A lever 16 engages the clutch sleeve 14. A rod or bar 18 connects the levers 15 and 16 to cause both to move in unison. The levers 15 and 16 may be moved to occupy a neutral position or to throw one or the other of the clutch sleeves 13 and 14 into engagement with the complemental clutches of the gear wheels 11 or 12. A lever 17 engages the rod 18 and serves as convenient means for operating the levers 15 and 16. A notched plate 17ᵃ on which the lever 17 is fulcrumed coöperates with a latch 18' on said lever to hold the same in the required position. A line shaft 19 is mounted in the frame of the machine and is provided with gear wheels 20 and 21 which are fastened thereto and are in mesh with the respective gear wheels 11 and 12. The several gear wheels 11, 12, 20, and 21 are of different diameters whereby the shaft 19 may be driven at different relative speeds from the countershaft 6. A pinion 23 secured to the shaft 19 is in mesh with a gear wheel 24 loose upon a shaft 26 upon which is loosely mounted a drum 27. The gear wheel 21 is in mesh with a gear wheel 25 loose upon the shaft 26. The face of the pinion 23 is long to admit of its teeth remaining in mesh with the teeth of the gear wheel 24 in either extreme position of such gear wheel. The teeth of the gear wheel 21 are long so as to remain in mesh with the teeth of the gear wheel 25 at either one of its extreme positions. Half clutches are formed upon the inner faces of the parts 24 and 25 and are adapted to engage half clutches 28 and 29, at the ends of the drum 27. A lever 30 engages the gear element 24 to shift the same upon the shaft 26 to throw it into or out of engagement with the half clutch 28. A lever 31 engages the gear element 25 to effect a movement thereof on the shaft 26 to throw the part 25 into or out of clutched engagement with the drum 27. A rod or bar 32 forms connecting means between the levers 30 and 31 to cause both to move in unison. The levers 30 and 31 may be moved to bring the parts 24 and 25 into neutral position or to throw either one into clutched engagement with the drum 27. A notched segment 33 is adapted to engage a latch of a lever 33ᵃ connected to the rod 32 to hold it in the required adjusted position. When the levers 30 and 31 occupy a neutral position the drum 27 is loose upon the shaft 26 and the gear elements 24 and 25 are free to rotate upon said shaft 26 without imparting movement either to the shaft or to the drum 27. A rope or cable 34 is secured at one end to the drum 27 and is adapted to wind thereon and such rope or cable is adapted to be secured to the object to be removed, whether the same be a stump, root, tree, boulder or the like. A crane 35 is mounted upon the frame and is equipped with block and tackle, the rope 37 being adapted to wind upon a windlass 36. The crane or like part 35 may be raised or lowered or moved laterally at its upper end by means of ropes 38 and 39 and windlasses 40 and 41. The rope 37 passes over a sheave pulley 42 at the upper end of the crane 35 and is provided with a pulley 43 at its lower end over which the rope 34 passes. By this means the pulley 43 may be adjusted to enable the power to be applied to the best possible advantage when moving an obstruction.

It will be observed that with the engine running at a uniform speed, the drum 27 may be rotated at different speeds according to the required force to be exerted for moving an object. When the gear wheel 25 is thrown into clutched engagement with the drum 27, the latter is rotated at a fast speed. When the gear wheel 24 is thrown into clutched engagement with the drum 27, the latter is rotated at a slow speed. When the clutch member 14 is thrown into clutched engagement with the gear wheel 12, the shaft 19 is rotated at a fast speed and when the clutch member 13 is thrown into engagement with the gear wheel 20, the shaft 19 is driven at a slow speed. By shifting the several gear and clutch elements, the required speed and power may be obtained thereby adapting the machine to the work in hand.

The pulley 7 is adapted to be connected with the shaft 6 by means of a suitable clutch. The movable clutch member is shown at 44 and consists of a cone and is adapted to be operated by means of a lever 45. By manipulating the lever 45, the mechanism may be thrown into or out of action without stopping the engine, which is indicated at 46.

From the foregoing description, taken in connection with the accompanying drawings, the advantages of construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. In a machine of the character specified, the combination of a drum, means for imparting movement thereto, a cable adapted to wind upon such drum, a sheave pulley for such cable to pass over, a crane supporting the sheave pulley, and means for adjusting the outer end of the crane up or down or laterally to move the sheave pulley into the required position.

2. In a machine of the character described, the combination of a drum, means for imparting movement thereto, a cable adapted to wind on such drum, a pulley over which said cable is guided, a second cable supporting the pulley, a windlass with which the second cable is connected, a pulley over which the second cable is guided, and a crane supporting the last mentioned pulley.

3. In a machine of the character described, the combination of a drum, means for imparting movement thereto, a cable adapted to wind on such drum, a pulley over which said cable is guided, a second cable supporting the pulley, a windlass with which the second cable is connected, a pulley over which the second cable is guided, and a crane supporting the last mentioned pulley, in combination with ropes terminally connected at one end with opposite sides of the crane, and windlasses on which said ropes are independently wound to provide for lateral adjustment of the crane.

4. In a machine of the character described, the combination of a drum, means for imparting movement thereto, a cable adapted to wind on such drum, a pulley over which said cable is guided, a second cable supporting the pulley, a windlass with which the second cable is connected, a pulley over which the second cable is guided, and a crane supporting the last mentioned pulley, in combination with ropes terminally connected at one end with opposite sides of the crane, and windlasses on which said ropes are independently wound to provide for lateral adjustment of the crane, and an independent windlass and rope, the latter being terminally connected with the top of the crane to effect vertical adjustment thereof.

In testimony whereof I affix my signature in presence of two witnesses.

ROBERT H. COLLAR.

Witnesses:
G. A. ENGELKING,
C. S. LARSEN.